(12) United States Patent
Weber

(10) Patent No.: US 11,059,341 B2
(45) Date of Patent: Jul. 13, 2021

(54) AIR SPRING FOR CONTROLLING THE LEVEL POSITION OF A DRIVER'S CABIN OR A MOTOR VEHICLE

(71) Applicant: Vibracoustic CV Air Springs GmbH, Hamburg (DE)

(72) Inventor: Michael Weber, Buchholz (DE)

(73) Assignee: Vibracoustic CV Air Springs GmbH, Hamburg (DE)

( * ) Notice: Subject to any disclaimer, the term of this patent is extended or adjusted under 35 U.S.C. 154(b) by 24 days.

(21) Appl. No.: 16/421,773

(22) Filed: May 24, 2019

(65) Prior Publication Data

US 2019/0359024 A1 Nov. 28, 2019

(30) Foreign Application Priority Data

May 25, 2018 (DE) ...................... 10 2018 112 627.1

(51) Int. Cl.
*B60G 17/052* (2006.01)
*B60G 11/58* (2006.01)
(Continued)

(52) U.S. Cl.
CPC .......... *B60G 17/0521* (2013.01); *B60G 11/58* (2013.01); *B60G 15/065* (2013.01);
(Continued)

(58) Field of Classification Search
CPC .... B60G 17/0521; B60G 1/58; B60G 15/065; B60G 15/066; B60G 15/12;
(Continued)

(56) References Cited

U.S. PATENT DOCUMENTS 2,361,575 A 10/1944 Thompson
3,074,709 A 1/1963 Ballard
(Continued)

FOREIGN PATENT DOCUMENTS

DE 102010012346 A1 9/2011
DE 102011011475 A1 8/2012
(Continued)

OTHER PUBLICATIONS

European Search Report, 19176471.1, dated Oct. 23, 2019.

*Primary Examiner* — Karen Beck
(74) *Attorney, Agent, or Firm* — Fishman Stewart PLLC

(57) ABSTRACT

An air spring includes a closing member, a rolling piston, and an air spring bellows connected to the rolling piston and the closing member to form a fluid-filled pressure chamber. A level control system for supplying and/or discharging fluid may be integrated into the pressure chamber to control level position based on air spring stroke. The level control system may have a control valve and an actuator connected to the control valve. The actuator may include a guide tube coupled to the rolling piston or closing member, and movably arranged within the pressure chamber. An actuating member may include a pin member and may operate the control valve. A compression spring may have a central spring and a biasing spring, and the guide tube may include a control flange coupled to the pin member, and the biasing spring may be supported to press the pin member against the control valve.

16 Claims, 3 Drawing Sheets

(51) Int. Cl.
  *B60G 15/06* (2006.01)
  *B60G 15/12* (2006.01)
  *B62D 33/06* (2006.01)
  *B62D 33/063* (2006.01)
  *F16F 13/00* (2006.01)
  *F16F 9/04* (2006.01)
  *B60G 17/08* (2006.01)
  *B60G 17/048* (2006.01)

(52) U.S. Cl.
  CPC ........... *B60G 15/066* (2013.01); *B60G 15/12* (2013.01); *B62D 33/0608* (2013.01); *B62D 33/0636* (2013.01); *F16F 9/0472* (2013.01); *F16F 13/002* (2013.01); *B60G 17/048* (2013.01); *B60G 17/08* (2013.01); *B60G 2202/152* (2013.01); *B60G 2202/314* (2013.01); *B60G 2206/42* (2013.01); *B60G 2500/30* (2013.01); *B60G 2800/162* (2013.01)

(58) Field of Classification Search
  CPC ........ B60G 2202/152; B60G 2202/314; B60G 2206/42; B60G 2500/30; B60G 2800/162; B60G 99/008; B60G 2500/302; B60G 2204/162; B60G 17/0528; B60G 17/08; B60G 17/048; B62D 33/0608; B62D 33/0636; B62D 33/10; F16F 13/002; F16F 2228/10; F16F 9/43; F16F 9/05; F16F 13/20; F16F 13/101
  See application file for complete search history.

(56) References Cited

U.S. PATENT DOCUMENTS

| | | | |
|---|---|---|---|
| 5,649,692 A * | 7/1997 | Gilsdorf | B60G 11/26 267/64.21 |
| 9,574,665 B2 | 2/2017 | Dengler | |
| 10,502,278 B2 | 12/2019 | Weber | |
| 2016/0016452 A1* | 1/2016 | Weber | B60G 17/0485 280/6.157 |
| 2017/0241504 A1* | 8/2017 | Delorenzis | B60G 17/08 |
| 2018/0253121 A1* | 9/2018 | Stuart | G05G 1/44 |

FOREIGN PATENT DOCUMENTS

| | | |
|---|---|---|
| DE | 102011108249 A1 | 1/2013 |
| EP | 2581625 A2 | 4/2013 |
| EP | 3141773 A1 | 3/2017 |

* cited by examiner

AIR SPRING FOR CONTROLLING THE LEVEL POSITION OF A DRIVER'S CABIN OR A MOTOR VEHICLE

CROSS-REFERENCE TO RELATED APPLICATIONS

This application claims priority to German Patent Application No. 10 2018 112 627.1, filed May 25, 2018, the contents of which are hereby incorporated by reference in its entirety.

TECHNICAL FIELD

The present invention relates to an air spring for controlling the level position of a driver's cabin or a motor vehicle comprising a closing member, a rolling piston and an air spring bellows, which is connected to the rolling piston and the closing member to form a fluid-filled pressure chamber.

BACKGROUND

Air springs of the aforementioned items are used to cushion two vehicle parts movable with respect to one another and thereby to increase the suspension comfort of motor vehicles or driver's cabins. In a deflection and rebound, the air spring bellows rolls off on the outer surface of the rolling piston, so as to absorb the induced vibrations.

Furthermore, it is known to integrate a damping function into an air spring. Such an air spring is also referred to as air spring damper. For this purpose, a hydraulic damper is integrated into the air spring, and/or the fluid located in the pressure chamber flows back and forth between the pressure chamber and another chamber via a damping channel.

In addition, air springs are also used to maintain or adjustably change a desired level position of a motor vehicle or a driver's cabin at different loads or weight loads. To that end, the pressure in the pressure chamber is changed by supplying fluid or by discharging fluid as a function of the air spring stroke. For this purpose, the pressure chamber is connected to a fluid source via a control valve, wherein the control valve supplies and discharges fluid into and out of the pressure chamber during a deflection and rebound or depending on the load state or the weight loads.

From DE 10 2011 108 249 A1 an air spring is known, which has a control valve that is integrated into the air spring and is mechanically actuated to control the level position of a motor vehicle or a driver's cab. The control valve is attached to the lid and comprises control valves for controlling the compressed air supply or compressed air discharge. The actuation of the control valves is performed via cams mounted on a rotatable camshaft. The rotational movement of the camshaft takes place via a drag lever, which rests with its free end on a contact surface on the rolling piston of the air spring. Due to the pivoting movement of the drag lever, the camshaft is rotated, whereby, depending on the deflection or rebound of the air spring, one of the cams actuates one of the plungers of the control valves which are locked by spring forces.

From DE 10 2011 114 75 A1 an air spring arrangement is known, which has an integrated valve control for controlling the level position of a motor vehicle or a driver's cab. The integrated valve control comprises an air inlet valve and an air exhaust valve. To open and close the valves, a compression spring means is provided, which is formed in two parts. The compression spring means has a central spring facing the rolling piston or the lid and a control valve biasing spring facing the air exhaust valve. The central spring and the control valve biasing spring are arranged on a guide tube supported between the rolling piston and the lid in an axially freely movable way. A radially projecting stop that serves as a control means for actuating the valve stem of the inlet valve is arranged between the two springs. The compression spring means is held between clamping means, wherein one of the clamping means actuates the exhaust valve. During deflection, the guide tube slides downward, and at the same time, the control valve biasing spring is compressed until, after overcoming a free travel, it contacts the stop and actuates the inlet valve. During a rebound, the guide tube moves upward, wherein the control valve bias spring rebounds, so that the clamping means associated with the exhaust valve moves away from this and opens the exhaust valve.

SUMMARY

The object of the present invention is to provide an air spring, which has an improved level control, improved comfort as well as a longer service life and is also inexpensive.

To solve the problem, an air spring with the features of claim 1 is proposed.

Advantageous embodiments of the air spring are the subject of the dependent claims.

Air spring for controlling the level position of a driver's cabin or of a motor vehicle, comprising a closing member, a rolling piston and an air spring bellows connected to the rolling piston and the closing member forming a fluid-filled pressure chamber, wherein a level control system for supplying and/or discharging fluid is integrated into the pressure chamber to control the level position of the driver's cabin or the motor vehicle depending on the air spring stroke, wherein the level control system has at least one control valve for supplying and/or discharging fluid into and out of the pressure chamber and an actuator that is operatively connected to the control valve, the actuator having a guide tube which is coupled to the rolling piston or the closing member and movably arranged within the pressure chamber, an actuating member which is formed as a pin member and operates the control valve, and a compression spring means, the compression spring means having a central spring coupled to the rolling piston or the closing member and a biasing spring coupled to the control valve, the guide tube having a control flange to which the pin member is coupled and on which the biasing spring is supported to press the pin member against the control valve.

Due to the structural design of the actuator, the biasing spring can be supported on the control flange over the entire surface, so that the entire spring force of the biasing spring presses on the actuating member and thus on the control valve. Thereby, the spring force or the bias of the biasing spring and the central spring can be reduced. Thus, the compression spring means of the air spring has a small bias in total, whereby the comfort and the acoustic behaviour of the air spring is improved. Due to the reduced bias of the compression spring means, the closing member can be made thinner, resulting in a saving of material. In addition, a material with a lower rigidity or strength, such as PA6, can be used for the closing member and/or the rolling piston, resulting in cost savings. Furthermore, the actuator has a small number of parts, so that the installation costs of the air spring are reduced. Further, the diameter of the rolling piston can be reduced, so that the rigidity of the air spring can be presented in a wider range. Finally, due to the structural design of the actuator, more installation space is available for a damper cap, so that its diameter can be increased, resulting in a longer service life of a buffer. In addition, the compression spring means, in particular the central spring, has a small spring travel. In addition, due to the structural design of the level control system, an auxiliary spring required from the prior art can be omitted, so that a surface coating abrasion on the hydraulic damper is avoided by the auxiliary spring during an integration of a hydraulic damper.

The fluid used is preferably air, in particular compressed air. Further, gas or a compressible medium can be used as the fluid.

In an advantageous embodiment, at least one damping device can be integrated into the air spring. The damping device can use the fluid in the pressure chamber as the working medium. For this purpose, the air spring can have another chamber besides the pressure chamber connected to each other via a damping channel. By varying the damping channel cross-section, the damping characteristic can be adjusted. In addition, a separate hydraulic damper can be integrated as a damping device into the air spring. An air spring provided with a damping device can also be referred to as an air spring damper.

In an advantageous embodiment, the pin member and the control flange are movable relative to each other. For this purpose, the pin member can be movably mounted in a through opening of the control flange. Advantageously, the control flange covers the control valve in the radial direction. Further advantageously, the control flange covers the entire surface of the biasing spring in the radial direction. This reduces the bias of the biasing spring and of the central spring. Additionally, the biasing spring can be supported on the control flange over the entire surface. Further advantageously, the guide tube is movable in the deflection and rebound direction within the pressure chamber.

In an advantageous embodiment, the biasing spring is supported over its entire surface on a side of the control flange facing the control valve. As a result, the entire force of the biasing spring presses on the exhaust valve.

In an advantageous embodiment, the central spring and the biasing spring are formed as compression springs. Thus, the central spring may be biased stronger than the biasing spring. In addition, the central spring may have a greater spring force than the biasing spring. The air spring stroke can be adjusted towards deflection over the spring travel of the central spring.

In an advantageous embodiment, the control flange is materially connected and materially coherent with the guide tube.

In an advantageous embodiment, the rolling piston, the closing member, the guide tube, the control flange and/or the pin member are made of a synthetic material, in particular a fibre-reinforced plastic.

In an advantageous embodiment, the biasing spring is biased such that at a rebound, the biasing spring presses the pin member against the control valve over a first free travel. As a result, the control valve is not already actuated during small rebound movements.

In an advantageous embodiment, the pin member and the control flange are movable relative to each other, so that the control flange moves relative to the pin member during a rebound of the air spring over a first free travel and after overcoming the first free travel, the control flange entrains the pin member and moves away from the control valve. Since the control flange and the pin member are movable relative to each other, the pin member is pressed against the control valve due to the bias of the biasing spring until the first free travel is overcome during a rebound of the air spring. Only after overcoming the first free travel, the pin member moves away from the control valve. The first free travel corresponds to the bias of the biasing spring. Advantageously, the pin member extends through a through opening inserted into the control flange.

In an advantageous embodiment, the pin member has an extension at a first end. The extension causes entrainment of the pin member during rebound when the control flange overcomes the first free travel. The pin member is advantageously movably guided in the through opening, wherein the diameter of the extension is greater than the diameter of the through opening.

In an advantageous embodiment, the extension is designed as latching lugs. The entrainment of the pin member during the rebound of the air spring takes place via the latching lugs after the control flange has overcome the first free travel. The latching lugs are advantageously arranged at a free end of the pin member. Furthermore, the latching lugs may be formed of elastically pivotable pins, which are separated from each other by recesses and provided at their free ends with a thickening. The entrainment of the pin member through the control flange is achieved with the thickening when the first free travel has been overcome. Furthermore, the pin member is attached on the control flange using the latching lugs. For this purpose, the pin member is inserted with the latching lugs into the through opening, so that the latching lugs pivot. When the latching lugs emerge from the through opening, they pivot back into their original position and thus prevent withdrawal of the pin member from the through hole.

In an advantageous embodiment, the pin member has a second end on a peripheral shoulder on which the biasing spring is supported to press the pin member against the control valve. Thus, the biasing spring exerts a force on the pin member via the peripheral shoulder to press it against the control valve. Accordingly, the biasing spring is supported on the one hand on the control flange and on the other hand on the shoulder and presses the pin member due to its bias against the control valve. In an advantageous embodiment, the diameter of the shoulder is larger than the diameter of the through opening.

In an advantageous embodiment, the control valve has an exhaust valve and an inlet valve, wherein the pin member is operatively connected to the exhaust valve and the control flange is operatively connected to the inlet valve. Fluid can be supplied to the pressure chamber via the inlet valve, and fluid can be discharged from the pressure chamber via the exhaust valve. Advantageously, the two valves are designed as spring valves. Due to the structural design of the actuator, the inlet valve and the exhaust valve can be made shorter compared to the valves known from the prior art. This results in a cost advantage. In addition, the low construction of the inlet valve reduces the abrasion in the inlet valve by the spring integrated therein and thus increases its service life. Advantageously, the bias or the spring force of the biasing spring is greater than the spring force of the spring of the exhaust valve.

In an advantageous embodiment, the actuator is configured such that during a rebound, the inlet valve is closed and the exhaust valve is open and during a deflection, the inlet valve is open and the exhaust valve is closed. In particular, the actuator is formed such that during a rebound after overcoming the first free travel the intake valve is closed and the exhaust valve is open and during a spring deflection after overcoming a second free travel the intake valve is open and the exhaust valve is closed. By adjusting the spring forces of the central spring and the biasing spring with respect to each another, a switching sequence can be easily achieved for the deflection and rebound of the air spring. In particular, a defined switching state can be set using the spring force or the bias of both springs.

In an advantageous embodiment, during a deflection after overcoming a second free travel, the control flange presses against the inlet valve in order to open the inlet valve. As a result, the intake valve is not actuated immediately upon spring deflection of the air spring, but only after overcoming the second free travel.

In an advantageous embodiment, the actuator has an additional spring which is arranged between the control flange and the inlet valve and which pushes the control flange away from the exhaust valve. Advantageously, the additional spring presses the pin member away from the exhaust valve after overcoming the first free travel. Thus, the spring causes the pin member to be moved away from the exhaust valve during rebound to open the exhaust valve.

In an advantageous embodiment, the central spring is arranged around the guide tube. In particular, the central spring is located directly on the guide tube. This guides the central spring during deflection and rebound.

In an advantageous embodiment, the rolling piston is connected to the guide tube via a flange member, wherein the flange member is supported on the central spring and is slidably mounted on the guide tube. Thus, during a deflection, the rolling piston presses on the central spring via the flange member, so that it is compressed at a deflection. In an advantageous embodiment, the guide tube has tabs on the end, which prevent the flange member from slipping off the guide tube. The flange member is advantageously formed as an annular disc, wherein the rolling piston is supported radially on the outside of the flange member. The annular disc may be provided with a sleeve portion located radially inward.

In an advantageous embodiment, the guide tube has at least one projection which moves during deflection and rebound within a channel introduced into the closing member. This prevents rotation between the actuator and a damper during deflection and rebound.

In an advantageous embodiment, the air spring has a damper on which the guide tube is movably arranged. As a result, the air spring also has a damping function in addition to the suspension and level control function. Further, the movement of the guide tube during deflection and rebound is guided securely on the damper. Preferably, the damper is formed as a hydraulic damper.

In an advantageous embodiment, at least one opening is introduced into the guide tube. The opening acts as a cooling window for the damper. In an advantageous embodiment, a plurality of openings is introduced into the guide tube.

In an advantageous embodiment, the control flange has an oval contour. As a result, the air spring bellows provided in a hose-like manner in the unpressurized state can simply be pulled over the control flange in order to mount the air spring.

BRIEF DESCRIPTION OF THE DRAWINGS

Hereinafter, the air spring and further features and advantages will be described with reference to an embodiment which is shown schematically in the accompanying figures. Hereby.

DETAILED DESCRIPTION

Figure 1:
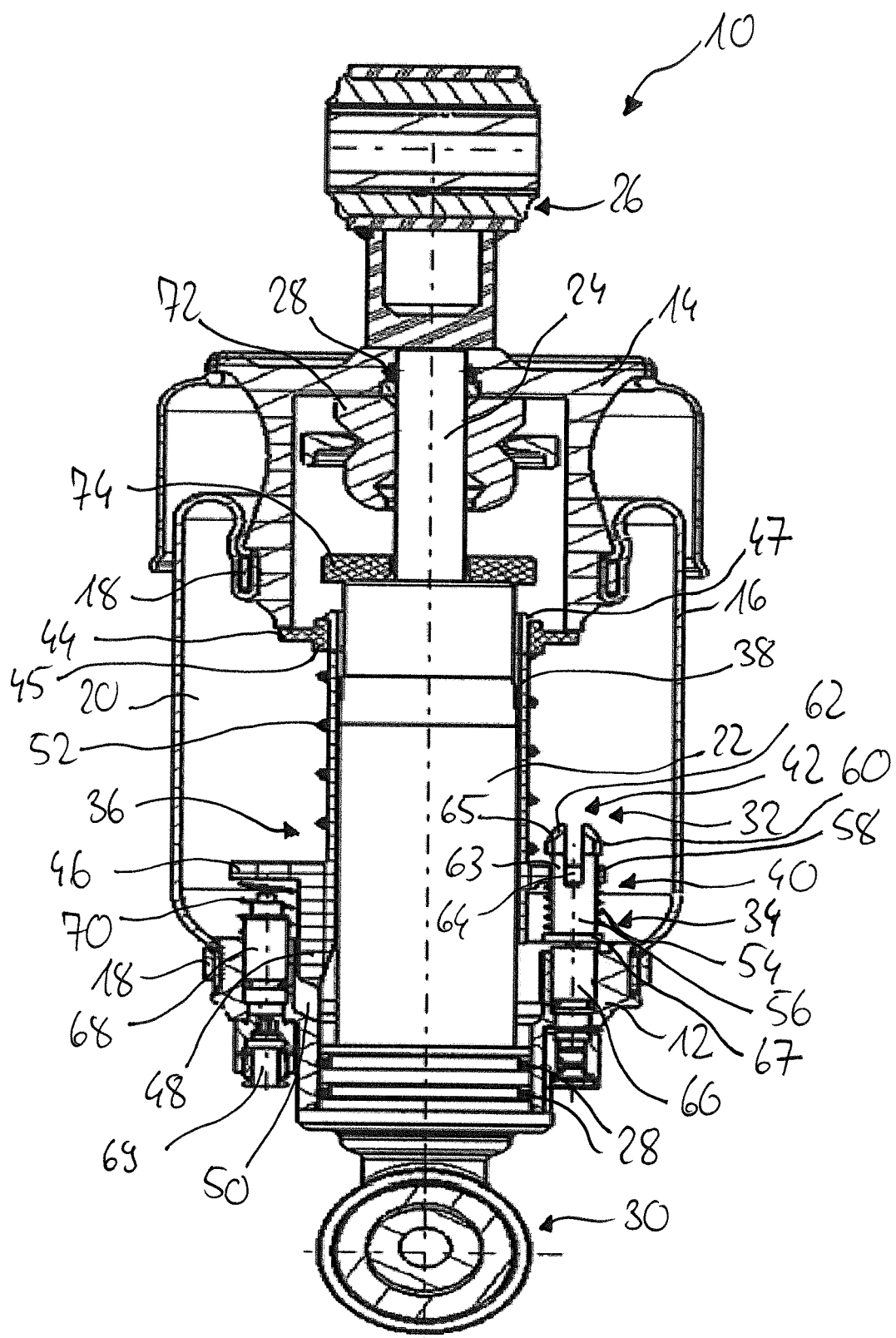
FIG. 1 shows a longitudinal section through an air spring with a level control system.

In FIG. 1, an air spring 10 is shown, which serves for controlling the level position of a driver's cab (not shown), or a motor vehicle (not shown).

The air spring 10 has a closing member 12, a rolling piston 14 and an air spring bellows 16 interconnecting the closing member 12 and the rolling piston 14. The air spring bellows 16 is respectively fastened to the closing member 12 and the rolling piston 14 in an airtight manner via a clamping ring 18 and forms a pressure chamber 20 which is filled with fluid. The fluid can be air, in particular compressed air, gas or a compressible medium.

The air spring 10 further includes a damper 22 whose piston rod 24 extends through the rolling piston 14 and is connected at its free end to a first elastomeric bearing 26. The air spring 10 is attached to a first vehicle part (not shown) by the first elastomeric bearing 26. A sealing ring 28 is provided between the rolling piston 14 and the piston rod 24 to seal the pressure chamber 20.

In order to limit the deflection movement of the air spring 10, a buffer 72 which is penetrated by the piston rod 24 and supported on a bottom of the rolling piston 14 is arranged within the rolling piston 14. The buffer 72 interacts with a damper cap 74 arranged on the upper side of the damper 22.

As can also be seen in FIG. 1, the damper 22 is connected to the closing member 12. In particular, the damper 22 extends through the closing member 12. Sealing rings 28 are provided between the closing member 12 and the piston rod 24 to seal the pressure chamber 20. At its end, protruding from the closing member 12, the damper 22 has a second elastomeric bearing 30, which serves to attach the air spring 10 to a second vehicle part (not shown).

A level control system 32 for supplying and/or discharging fluid is also integrated into the pressure chamber 20 in the air spring 10 to control the level position of the motor vehicle or a driver's cabin as a function of air spring stroke.

The level control system 32 has at least one control valve 34 for supplying and/or discharging fluid into and out of the pressure chamber 20 and an actuator 36 which is an operative connection with the control valve 34.

The actuator 36 has a guide tube 38 coupled to the rolling piston 14 and movably arranged on the damper 22, an actuating member 40 which actuates the control valve 34, and a compression spring means 42.

The guide tube 38 is connected to the rolling piston 14 via a flange member 44. The flange member 44 is formed as an annular disc and has a sleeve portion 45 located radially inwards which is slidably mounted on the guide tube 38. The rolling piston 14 is supported radially on the outside of the flange member 44. In order to prevent the flange member 44 from slipping off the guide tube 38, the guide tube 38 has tabs 47 at its end.

At its end, facing the control valve 34, the guide tube 38 has a control flange 46 which is formed oval. Due to the oval contour of the control flange 46, the air spring bellows 16, which, in the pressureless state, are in the form of a tube, can simply be pulled over the control flange 46 for mounting the air spring 10.

Figure 2:
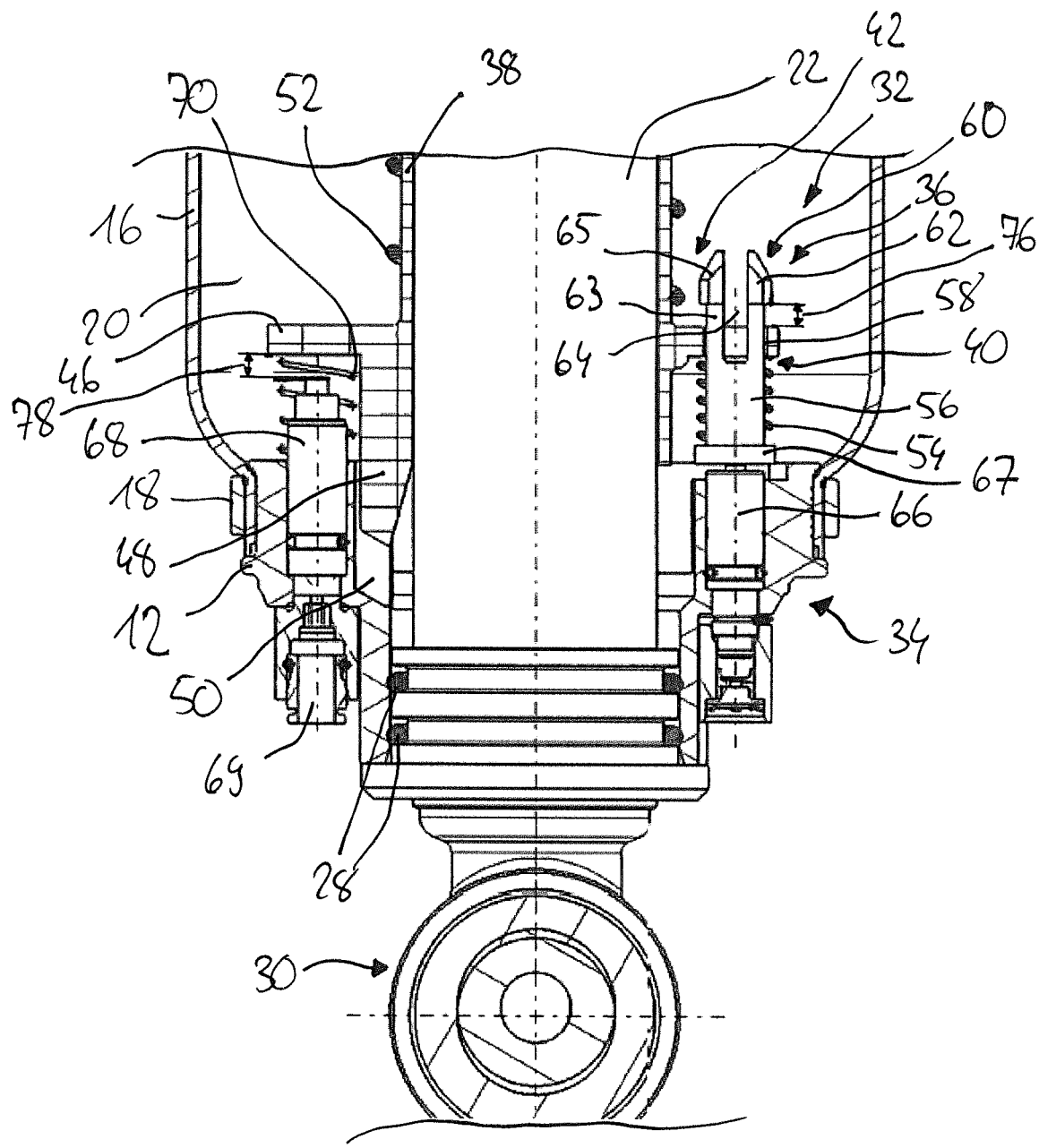
FIG. 2 shows an enlarged detail of the longitudinal section of the control valve of FIG. 1.

As can be seen in FIG. 2, the guide tube 38 has a projection 48, which is guided in channel 50 formed in the closing member 12. During deflection and rebound of the air spring 10, the projection 48 moves in the channel 50. This prevents rotation between the damper 22 and the actuator 36 during deflection and rebound.

Figure 3:
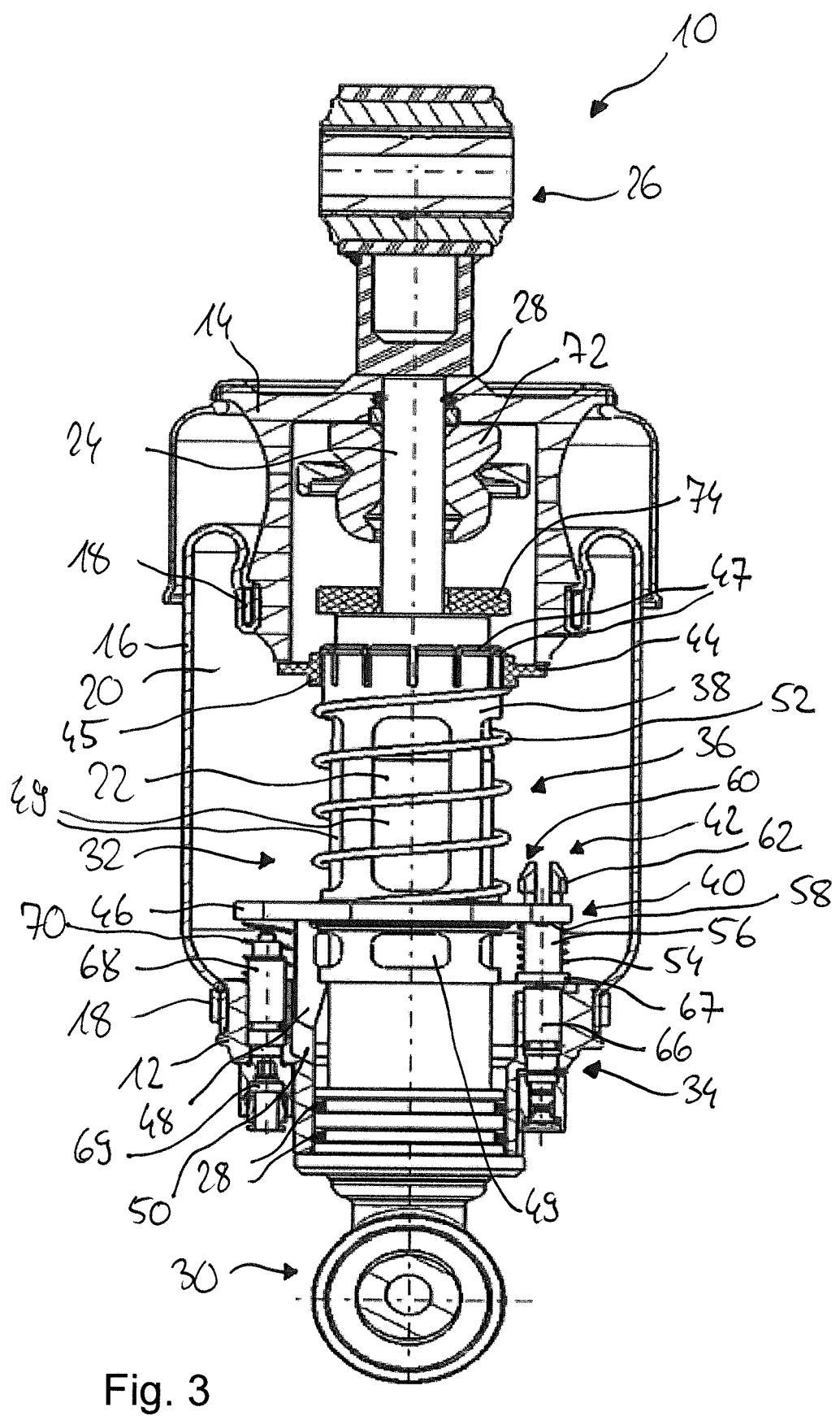
FIG. 3 shows a longitudinal section through the air spring, wherein the level control system is shown uncut.

As can be seen in FIG. 3, the guide tube 38 has a plurality of openings 49. The openings 49 serve to cool the damper 22.

The compression spring means 42 has a central spring 52 which surrounds the guide tube 38 and a biasing spring 54 which is associated with the control valve 34. Both springs are designed as compression springs, wherein the central spring 52 is biased stronger than the biasing spring 54. The flange 54 is supported on the central spring 52. The central spring 52 is supported on the control flange 46. The biasing spring 54 is coupled to the actuating member 40 and is supported over its entire surface on a bottom of the control flange 46.

As can be seen in particular in FIG. 2, the actuating member 40 is formed as a pin member 56 which movably extends through a through hole 58 formed in the control flange 46.

The pin member 56 has an extension 60 in the form of latching lugs 62 on the side facing away from the control valve 34. The latching lugs 62 are formed as pins 63 with thickenings 65 at their free ends. The pins 63 are separated by recesses 64, so that the latching lugs 62 are pivotable. The pin member 56 is attached to the control flange 46 via the latching lugs 62. For this purpose, the pin member 56 is inserted with the latching lugs 62 into the through opening 58. As a result, the latching lugs 62 are pressed together, so that the pin member 56 can be pushed through the through opening 58. When the latching lugs 62 emerge from the through opening 58, they pivot back into their original position and thus prevent the pin member 56 from being pulled out of the through opening 58.

As can also be seen in FIG. 2, at the end facing a control valve 34, the pin member 56 has a peripheral shoulder 67 on which the biasing spring 54 is supported to press the pin member 56 against the control valve 34.

The control valve 34 has an exhaust valve 66 and an inlet valve 68, both of which are designed as spring valves, the exhaust valve 66 being operatively connected to the pin member 56 and the inlet valve 68 being operatively connected to the control flange 46. As can also be seen from FIG. 2, a spring 70, associated with the actuator 36, is arranged between the control flange 46 and the inlet valve 68.

When the exhaust valve 66 is opened, fluid is discharged from the pressure chamber 20 during rebound. When the inlet valve 68 is opened, fluid is supplied to the pressure chamber 20 during a compression. For this purpose, the inlet valve 68 is connected via a connector 69 with a fluid supply means (not shown)

In the state shown in FIGS. 1 and 3, the exhaust valve 66 and the inlet valve 68 are closed by the pin member 56 being pressed against the exhaust valve 66 by the bias of the compression spring means 42 and the control flange 46 being spaced from the inlet valve 68. In order for the exhaust valve 66 to remain closed, the bias of the biasing spring 54 must be greater than the bias of the spring in the exhaust valve 66. To open the exhaust valve 66 during rebound, the guide tube 38 will be moved away from the control valve 34 due to the bias of the spring 70, wherein after overcoming a first free travel 76 from the control flange 46, the pin member 56 is entrained via the latching lugs 62 and thus moved away from the exhaust valve 66. To open the inlet valve 68 during a deflection, the control flange 46 presses on the inlet valve 68 after overcoming a second free travel 78 and the spring force of the spring 70.

Hereinafter, the control of the level position of the air spring 10 by the level control system 32 will be described. In FIGS. 1 and 3, the neutral position of the air spring 10 is shown, in which the exhaust valve 66 and the inlet valve 68 are closed.

During a compression or loading, the piston rod 24 moves into the damper 22 and at the same time the air spring bellows 16 rolls off on the rolling piston 14. As a result, the rolling piston 14 moves towards the closing member 12 downwards and thus exerts a force on the flange member 44. Since the flange member 44 is supported on the central spring 52, the central spring 52 exerts a pressure on the guide tube 38, so that the guide tube is moved towards the closing member 12. During deflection, the compression spring means 42 and the control flange 46 press the pin member 56 against the exhaust valve 66. As a result, the exhaust valve 66 is closed during deflection. At the same time the guide tube 38 moves due to the force induced by the central spring 52 on the closing member 12, wherein the control flange 46 compresses the spring 70. After overcoming the second free travel 78, the flange member 44 presses on the inlet valve 68. As a result, the inlet valve 68 is opened so that fluid flows via the inlet valve 68 into the pressure chamber 20. In a further deflection central spring 52 is compressed and thus takes over the rebound.

During a rebound or discharge, the rolling piston 14 moves upwards away from the closing member 12, wherein the central spring 52 rebounds and presses the flange member 44 upwards. At the same time, the biasing spring 54 and the spring 70 press the guide tube 38 upwards. As long as the first free travel 76 is not overcome, the control flange 46 moves relative to the pin member 56, wherein the pin member 56 is further pressed against the exhaust valve 66 due to the bias of the biasing spring 54. After overcoming the first free travel 76, the biasing spring 54 is completely rebounded, so that only the spring 70 presses the guide tube 38 towards the rolling piston 14. After overcoming the first free travel 76, the control flange 46 entrains the pin member 56 via the latching lugs 62. Thereby, the pin member 56 is moved away from the exhaust valve 66 and the exhaust valve 66 is opened, so that fluid from the pressure chamber 20 flows into the surroundings.

In the air spring 10, due to the structural design of the actuator 36, the biasing spring 54 can be supported over the entire surface on the control flange 46, so that the entire spring force of the biasing spring 54 presses on the pin member 56 and thus on the exhaust valve 66. Thereby, the spring force or the bias of the biasing spring 54 and the central spring 52 can be reduced. Thus, the compression spring means 42 of the air spring 10 has a small bias in total, whereby the comfort and the acoustic behaviour of the air spring 10 are improved. Due to the reduced bias of the compression spring means 42, the closing member 12 can be made thinner, which leads to a saving of material. In addition, a material with a lower rigidity or strength, such as PA6, can be used for the closing member 12 and/or the rolling piston 14, which leads to a cost saving. Moreover, the actuator 36 has a low number of parts, so that the installation costs of the air spring 10 are reduced. Furthermore, the diameter of the rolling piston 14 can be reduced, so that the rigidity of the air spring 10 can be presented in a wider range. Finally, due to the structural design of the actuator 36, more installation space is available for the damper cap 74, so that its diameter can be increased resulting in a higher service life of the buffer 72. In addition, the compression spring means 42, in particular the central spring 52, has a small spring travel.

The invention claimed is:

1. An air spring for controlling a level position of a driver's cabin or a motor vehicle, the air spring comprising:
   a closing member,
   a rolling piston, and
   an air spring bellows connected to the rolling piston and the closing member to form a fluid-filled pressure chamber,
   wherein a level control system for supplying and/or discharging fluid is integrated into the pressure chamber to control the level position of the driver's cabin or the motor vehicle depending on an air spring stroke; wherein the level control system has at least one control valve for supplying and/or discharging fluid to and/or from the pressure chamber, and an actuator that is operatively connected to the control valve; wherein the actuator includes a guide tube coupled to the rolling piston or the closing member and movably arranged within the pressure chamber, an actuating member formed as a pin member and configured to operate the control valve, and a compression spring; wherein the compression spring has a central spring coupled to the rolling piston or the closing member, and a biasing spring coupled to the pin member; and wherein the guide tube has a control flange to which the pin member is coupled and on which the biasing spring is supported to press the pin member against the control valve.

2. The air spring according to claim 1, wherein the pin member and the control flange are movable relative to each other, such that the control flange moves relative to the pin member during a rebound of the air spring over a first free travel and after overcoming the first free travel, the control flange entrains the pin member and moves it away from the control valve.

3. The air spring according to claim 1, wherein the pin member has an extension at a first end.

4. The air spring according to claim 3, wherein the extension comprises latching lugs.

5. The air spring according to claim 1, wherein the pin member has, at a second end, a peripheral shoulder on which the biasing spring is supported to press the pin member against the control valve.

6. The air spring according to claim 1, wherein the control valve has an exhaust valve and an inlet valve; and the pin member is operatively connected to the exhaust valve and the control flange is operatively connected to the inlet valve.

7. The air spring according to claim 6, wherein the actuator is configured so the inlet valve is closed and the exhaust valve is opened during a rebound, and the inlet valve is opened and the exhaust valve is closed during a deflection.

8. The air spring according to claim 6, wherein during a deflection, after overcoming a second free travel, the control flange is pressed against the inlet valve to open the inlet valve.

9. The air spring according to claim 6, wherein the actuator has another spring which is arranged between the control flange and the inlet valve and which presses the control flange away from the exhaust valve.

10. The air spring according to claim 1, wherein the central spring is arranged around the guide tube.

11. The air spring according to claim 1, wherein the rolling piston is connected to the guide tube via a flange, wherein the flange is supported on the central spring and is slidably mounted on the guide tube.

12. The air spring according to claim 1, wherein the guide tube has at least one projection which moves during a deflection and rebound within a channel that is introduced into the closing member or the rolling piston.

13. The air spring according to claim 1, wherein a damper is movably attached on the guide tube.

14. The air spring according to claim 1, wherein at least one opening is introduced into the guide tube.

15. The air spring according to claim 1, wherein the control flange has an oval contour.

16. An air spring for controlling a level position, the air spring comprising:
   a closing member,
   a rolling piston, and
   an air spring bellows connected to the rolling piston and the closing member to form a fluid-filled pressure chamber, the fluid-filled pressure chamber including a level control system for supplying and/or discharging fluid to and/or from the pressure chamber to control the level position depending on an air spring stroke;
   wherein the level control system has at least one control valve for supplying and/or discharging fluid into and/or out of the pressure chamber, and an actuator that is operatively connected to the control valve; wherein the actuator includes a guide tube coupled to the rolling piston or the closing member and movably arranged within the pressure chamber, an actuating member formed as a pin member and configured to operate the control valve, and a compression spring means; wherein the compression spring means includes a central spring coupled to the rolling piston or the closing member, and a biasing spring coupled to the control valve; and wherein the guide tube includes a control flange to which the pin member is coupled and on which the biasing spring is supported to press the pin member against the control valve.

* * * * *